Figure 1:
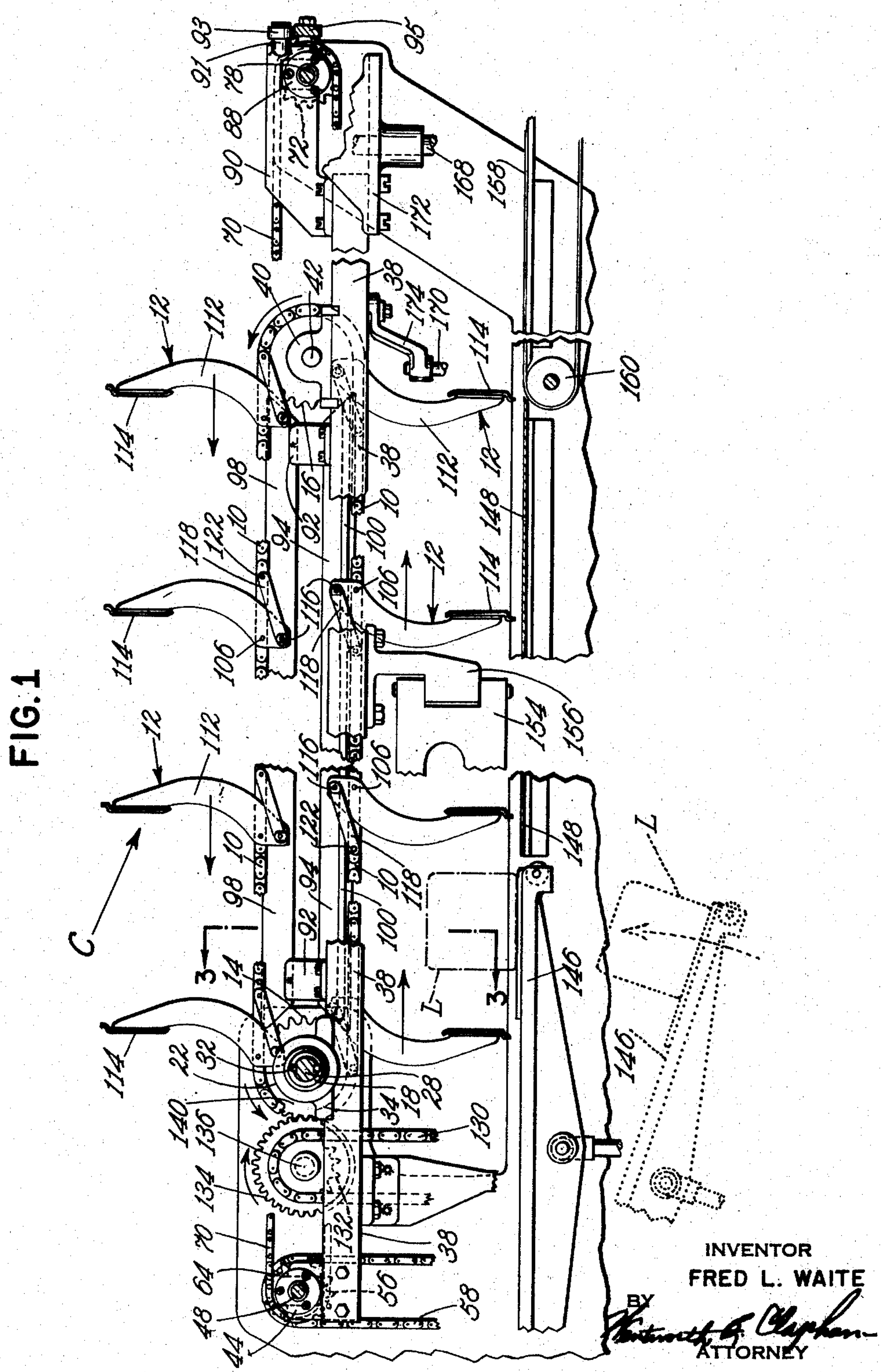

May 19, 1959 F. L. WAITE 2,887,212

WRAPPING MACHINE ARTICLE TRANSFER AND CONVEYING MECHANISM

Filed Oct. 1, 1956 3 Sheets-Sheet 1

INVENTOR
FRED L. WAITE
BY
ATTORNEY

May 19, 1959 F. L. WAITE 2,887,212
WRAPPING MACHINE ARTICLE TRANSFER AND CONVEYING MECHANISM
Filed Oct. 1, 1956 3 Sheets-Sheet 3
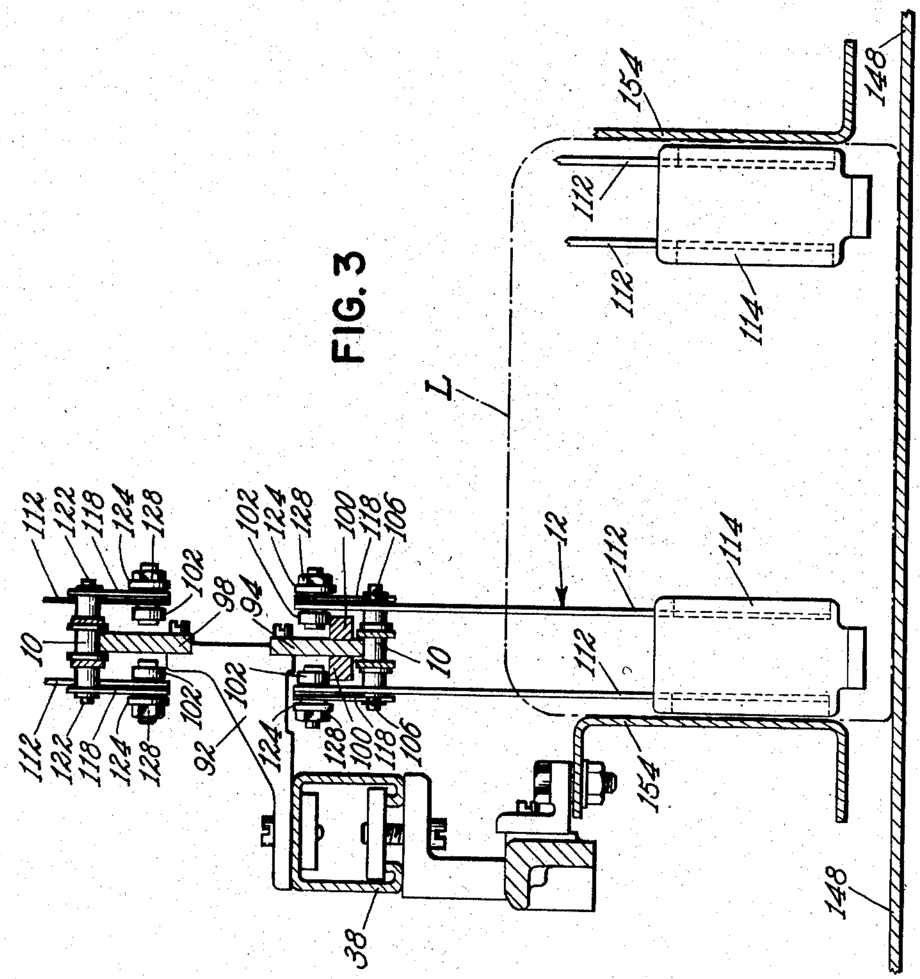
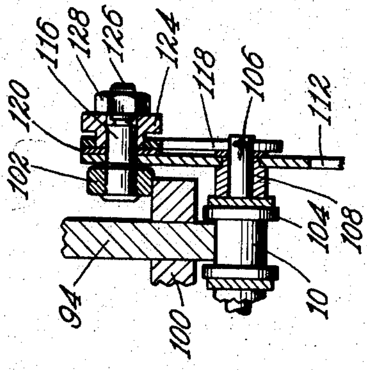
INVENTOR
FRED L. WAITE
BY Kenworth G. Clapham
ATTORNEY United States Patent Office 2,887,212

Patented May 19, 1959

2,887,212

WRAPPING MACHINE ARTICLE TRANSFER AND CONVEYING MECHANISM

Fred L. Waite, East Williston, N.Y., assignor to American Machine & Foundry Company, a corporation of New Jersey Application October 1, 1956, Serial No. 613,124

5 Claims. (Cl. 198—170)

This invention relates to conveying mechanisms, and more particularly to improvements in wrapping machine conveying devices which are adapted to convey articles of different sizes through a wrapping machine.

In the conveyance of articles such as, for example, loaves of bread in wrapping machines for wrapping operations, the articles are frequently carried or pushed or otherwise contacted by spaced members which distribute the forces exerted on the articles and which furthermore enable the alignment of the articles as desired. It is highly desirable that the lateral spacing of these contacting members be controllable to enable the conveyance of articles whose sizes may vary through the wrapping machine and past the end folders and sealers for wrapping and sealing the end folds in secure package forming positions.

In many conveying operations in wrapping machines, several articles are conveyed simultaneously and, for such operations, sets of spaced article contacting members or pushers are provided for the guidance thereof through the foldway and sealway. Consequently, an adjustment of the spacing of article contacting members may involve the adjustment of a large number of sets or laterally spaced pairs of such members and, in consonance with present day high speed production methods, this operation should be executed as simply as possible.

It is an object of the invention to provide a novel conveying device in which article contacting members are provided with an adjustable spacing, the means controlling the spacing being adapted to simple and efficient operation.

A further object of the invention is to provide a novel conveying device wherein a plurality of sets or pairs of laterally spaced article contacting members can be adjusted simultaneously and precisely to or from each other to effect a high sped adaptation of the device to articles of different sizes.

Types of conveying systems heretofore employed spaced sets of chains or other forms of linked elements and utilized support members suspended between the sets of chains to carry the article contacting elements. These suspended support members, however, added to the cost and weight of the conveying system and, consequently did not add to the desirability of the system. Furthermore, where such supporting members were employed, it was usually necessary to position the article contacting elements so that they were spaced from the associated chains. This characteristic led to the setting up of undesirable stresses in the supporting members such as torque, which not only disturb the article alignment but also detract from the longevity of the system.

Accordingly, it is a further object of the invention to provide a novel conveying system, including laterally adjustably spaced article contacting members, which avoids the disadvantages inherent in those types of systems which employ suspended support members for positioning the article contacting members.

It is also an object of the invention to provide a novel conveying system wherein the article contacting members are so positioned with respect to the associated driving members, such as chains, that undue leverage and stresses are avoided.

It is also a further object of the invention to provide means which not only permit the adjustment of the flights of the pairs of flights to and from each other, but also make possible the individual adjustment of each flight of a pair of flights relative to the other so that exact parallelism is obtained. This is extremely important because it insures that all the packages formed in the wrapping operations will have square end folds and the longitudinal bottom seams will lie parallel to the longitudinal axis of each article wrapped.

A further object of the invention is to adjust each pair of pushers relative to all other pairs of pushers extending along the length of the conveyor such that each article advanced by the pairs of flights is in exact timed relation in the machine and subsequent wrapping operations are exactly similar on all packages.

With these and other objects not specifically mentioned in view, the invention consists in certain constructions and combinations hereinafter fully described and then set forth in the claims hereunto appended.

Figure 2:
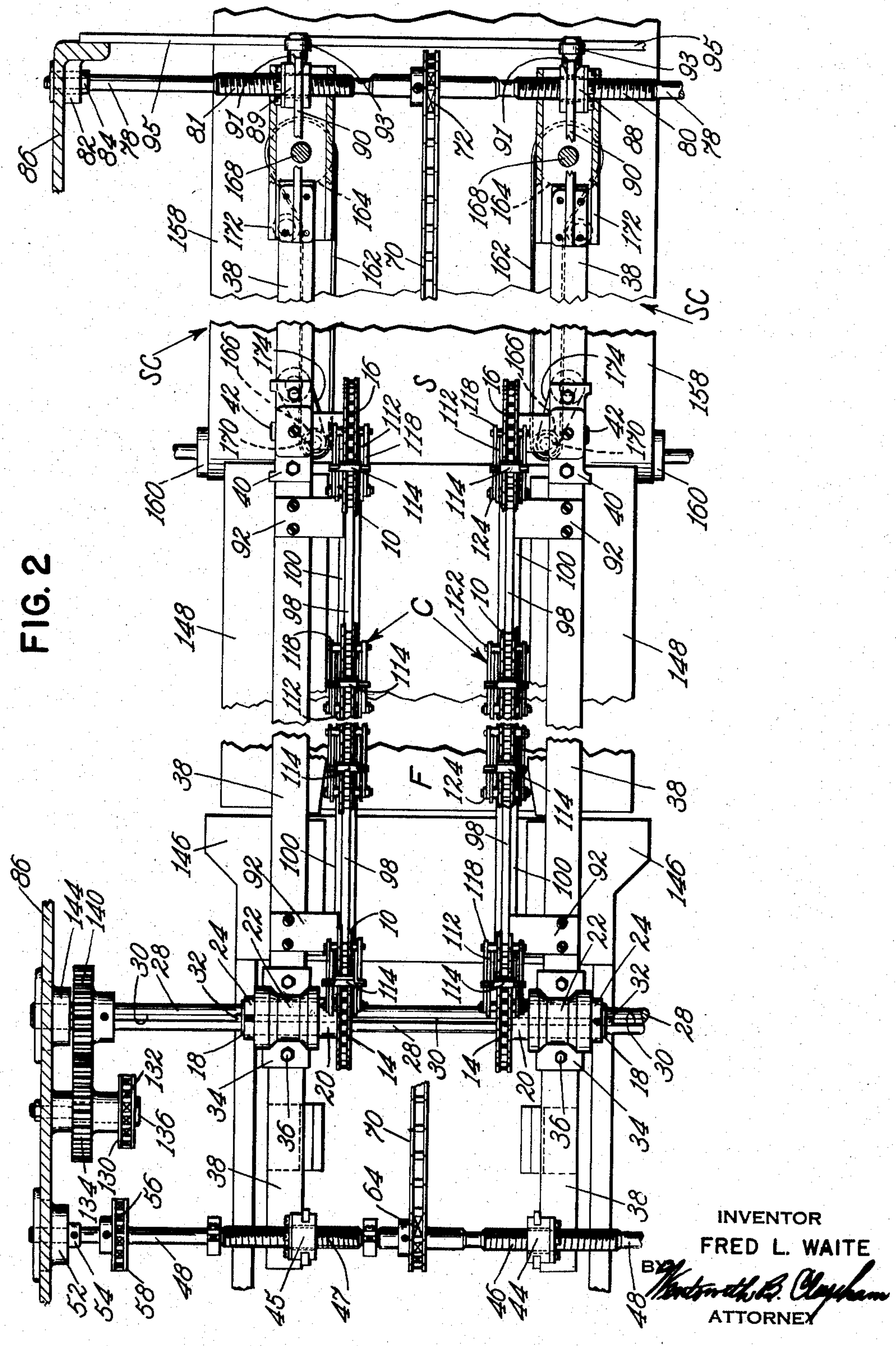

In the accompanying drawings which illustrate a preferred embodiment of the invention and form a part of this specification, and in which like reference characters designate the same or like parts:

Figure 1 is a side elevation of a wrapping machine article transfer and conveying mechanism embodying features of the invention, Figure 2 is a plan view of the mechanism shown in Figure 1, Figure 3 is a partial sectional end elevation, taken on line 3—3 of Figure 1, illustrating one side of a conveyor guide and supporting mechanism included therein, and Figure 4 is a sectional end elevation illustrating a detail of the flight or pusher mounting and adjusting mechanism.

In accordance with the invention there is provided a novel conveying mechanism forming an operative part of a wrapping machine of the general type disclosed in Kottmann, Patent 2,747,349 granted May 29, 1956 or other wrapping machine in which it can be adapted for use. The prime purpose of the novel structure constituting the invention is the removal from the machine lifter table by the flights of the conveyor of partially wrapped articles, and the travel of such articles by the flights through the foldway and sealway of the machine in completing the wrapping operations.

In the mechanism selected for purposes of illustration endless chains are used for supporting and advancing the pushers or flights. These chains are supported on and driven by sprockets mounted on laterally spaced elongated bars or like supports. A reversible drive and means cooperative therewith are provided for effecting and controlling the lateral spacing of the chains.

The flights are mounted directly on the chains in a manner hereinafter described in greater detail and, as a result, the spacing of the chains determines the spacing of the flights. The mounting of the flights on the chains and, as well, the particular means by which this mounting is effected are features of the invention which assist in achieving the aforenoted objectives of the invention.

Moreover, the spaced bars are so mounted and positioned as to form supports for the chains in a manner to be subsequently detailed and thus constitute another feature of the invention, the remaining features of which will be apparent in the following description.

With reference next to the drawings, which show a preferred embodiment of the invention, the conveying mechanism designated generally C consists of endless conveyor chains 10 which are spaced transversely to the direction of the conveyance and upon which are supported flights 12 which are the article contacting or article conveying elements. Flights 12 are spaced equidistantly along chains 10 and are so located on their chains that two laterally spaced flights 12 form an operating article advancing pusher or flight. The flights of each pair can be moved with their respective supporting chains to and from each other to obtain a desired adjustment. Each individual flight is also mounted for adjustment longitudinally in order that the flights of each pair or set of flights can be positioned accurately in line. This insures square end folds, and bottom seams which are parallel with the longitudinal edges of articles being wrapped.

Chains 10 are supported at one end on driving sprockets 14 and at the opposite end by driven sprockets 16. Sprockets 14 are provided with hubs 18. These hubs are shaped adjacent sprockets 14 as spacing collars 20 which space the sprockets 14 from bearings 22 which support hubs 18 for rotation therein. Hubs 18 are locked, with respect to their longitudinal directions, in their respective bearings 22 by means of collars 24 engaging hubs 18 through set screws 26.

For purposes of driving sprockets 14 in unison, a shaft 28 is employed, and is provided with keyways 30 which engage with keys 32 carried by hubs 18. Accordingly, hubs 18 and sprockets 14, as well as bearings 22 mounted on and are free to move axially along shaft 28, but hubs 18 and sprockets 14 will rotate in accordance with the rotation of shaft 28.

Bearings 22 are mounted by brackets 34 and bolts 36 on bars 38 which are parallel to chains 10 and to the direction of travel of flights 12 through the foldway and sealway of the machine. Bars 38 support bearing brackets 40 in which axles 42 of sprockets 16 rotate freely. Bars 38 also support internally threaded hubs 44 and 45 engaging with left and right hand threaded portions 46 and 47, respectively, of the shaft 48.

Shaft 48 is supported for rotation in a pair of bearings 52 and is fixed against axial displacement by collars 54. Mounted on shaft 48 is a sprocket 56 driven by chain 58. A power source (not shown) is adapted for driving chain 58 in either direction as desired for the rotation of sprocket 56 either clockwise or counter-clockwise. Thus, due to the fact that shaft portions 46 and 47 are oppositely threaded, hubs 44 and 45, and consequently bars 38 can be moved towards or away from each other.

A sprocket 64 also mounted on shaft 48 constitutes a drive for chain 70 supported at its opposite end on sprocket 72 fixed to shaft 78, which is also provided with a left hand, and a right hand threaded portion 80 and 81, respectively, corresponding to portions 46 and 47 on shaft 48. Shaft 78 is supported in a pair of bearings 82 and is guarded against axial displacement by collar 84. Bearings 82 are mounted on the frame 86 of the machine which also supports bearings 52. The left and right hand threaded portions 80 and 81 of shaft 78 engage with left and right hand threaded hubs 88, and 89, respectively, which are connected to corresponding bars 38 by means of brackets 90. Through the provision of chain 70, rotation of shaft 48 for adjustment of the lateral spacing between hubs 44 and 45 causes an identical adjustment of the spacing between hubs 88 and 89 and consequently, the ends of bars 38 and hence the bars themselves can be adjusted laterally uniformly. This adjustment applies as well to chains 10.

In order to prevent the center portion of shaft 78 from sagging and provide additional and friction-free support for the same, brackets 90 are equipped with bosses 91 which pivotally support rollers 93. These rollers engage with and are supported by a transverse rail 95. The latter, at each end is secured to the main frame 86 of the machine. These elements are shown in enlarged scale in Figs. 3 and 4. Mounted on bars 38 are longitudinally spaced brackets 92 to which are attached elongated tracks 94 engaging the lower runs of chains 10, and tracks 98 located below and supporting the upper runs of chains 10. These elements are shown in enlarged scale in Figs. 3 and 4, and in Figure 3 it can be seen that the channel construction of bars 38 provides maximum strength with minimum weight. It also facilitates the mounting of the several elements comprising foldway F and sealway S. From what has been said, it will be apparent that tracks 94 and 98 form a part of the assembly including associated bars 38, since they are rigidly supported thereby.

Attached to and extending along the opposite faces of bars 94 is a pair of rails 100 upon which ride rollers 102. One roller 102 is associated with each flight 12, as will be described more in details hereinafter.

Tracks 94 and 98 are vertically positioned, elongated bars extending lengthwise of the machine, and preferably are rectangular in cross section. Bars 94 engage the rollers of the link chains 10 of the conveying system C between the side faces 104 of the links thereof, and consequently provide vertical and horizontal guides therefor. A plurality of equally spaced chain rollers carry studs 106 which extend outwardly through bushings 108 in the rollers and are operative to support the vertical arms 112 of flights or pushers 12. Upper tracks 98 provide elongated supports along which the rollers of the upper laps of chains 10 run.

Referring to Figures 1 and 3, it will be seen that each flight or pusher 12 consists of two vertical arms 112 which support at or adjacent their lower end portions a pusher plate 114. At their upper ends, arms 112 carry studs 116, upon which are rotatably supported rollers 102. Studs 116 also carry eccentric bushings 124 to which are pivotally connected one end of links 118 which are spaced from vertical arms 112 by washers 120. The other ends of links 118 are pivotally attached to studs or pins 122 projecting from the links of the chains 10. Eccentric bushings 124 are held against rotation in studs 116 by means of nuts 128 engaging with the threaded ends 126 on studs 116. By virtue of the eccentric bushings 124, it is possible to adjust the angular displacement of links 118 and the individual flights 12 of each pair of laterally spaced flights mounted on chains 10. This is done by turning bushing 124 before nuts 128 are turned home, thereby effecting an adjustment which results in a very accurate alignment of pusher plates 114. Because of the mounting and adjustability of each individual flight or pusher 12, each set or pair of pushers can be positioned in an exactly straight line extending transversely across the foldway F which means that there can be no skewing of articles being wrapped as they are advanced by a pair of flights 12 through foldway F to the sealways. Thus, each package will have exceptionally square end folds, and bottom seams in which the edges of the wrapper are parallel to the longitudinal axis of each article wrapped. Furthermore, because of this adjustment, each pair of flights or pushers 12 can be brought into exact timing sequence with the other sets of pushers or flights 12 extending along chains 10.

Links 118 cooperate with flights 12 when the latter are moving around their driving and driven sprockets 14 and 16 to enable a continued displacement of articles engaged by pusher plates 114 on flights or pushers 12 in successive parallel planes until each article being conveyed through foldway F is delivered to sealway for discharge from the machine.

Chains 10 are driven by a chain 130 from a suitable source of power. Chain 130 runs on sprocket 132 formed integrally with gear 134 mounted on stud shaft 136 and meshing with gear 140 fixed to shaft 28, suitably rotatably supported in bearings 144 on the machine frame 86.

In operation, lifter table 146 is moved from broken line position to full line position shown in Figure 1 where a partially wrapped article, such as a loaf of bread L, is about to be engaged by a pair of pushers or flights 12 and conveyed from lifter table 146 to and through foldway F, from which wrapped articles are delivered into sealway S. Referring to Figures 1 and 2, the foldway F comprises end folders 154 supported on brackets 156 attached to bars 38. The construction and operation of the end folding mechanism may be similar to that shown in Kottmann Patent 2,747,349. Since it forms no specific part of the invention further showing and description is omitted.

Wrapped articles are delivered by conveying system C to a supplementary conveying system SC, which is provided to receive the wrapped article, seal the end folds and bottom seams together, and cool the hot seals.

Supplementary conveying system SC includes a horizontal conveyor belt 158 supported on roller 160 and two laterally spaced vertical heat sealer belts 162 supported on and driven by rollers 164 and 166. Shafts 168 and 170 depend from bars 38 by means of brackets 172 and 174 and consequently the lateral spacing of belts 162 is adjustable under control of bars 38.

In the conveying system described above and prior to the operation thereof, the pairs or sets of flights 12 which are laterally spaced transversely to the direction of conveyance and accurately aligned by means of the eccentric bushings 124 which are positioned before the tightening of nuts 128. Next, spindles 48 and 78 are driven in one direction of rotation or the other by suitably driving sprocket 56 through chain 58, this operation controlling the spacing of the bars 38 with alignment of the ends thereof due to operation of the chain 70. Thus, the spacing of the chains 10 and flights 12 transverse to the direction of conveyance is controlled as well as the corresponding spacing of the operational elements dependent from the bars 38 as has been described in accordance with the length of a succession of articles to be wrapped.

Chain 130 is driven in order to rotate shaft 28, it already having been noted that the axial disposition of the sprockets 14 thereupon has no effect on the rotational coupling between these elements. Moreover, it is to be noted that it is entirely possible to adjust the spacing of the bars 38 and hence sprockets 14 without in any way interfering with the continuous operation of the conveying system.

Lifter table 146 lifts articles, such as partially wrapped loaves of bread, into position in line with the horizontal table 148 where they are engaged by the driven flights 12, all of the members being appropriately spaced, and sets of flights 12 thereafter push them between the spaced end folding members 154. At the end of the table 148, the pusher plates 114 are displaced in successive parallel planes until the loaves are discharged into the supplemental conveying system SC as described above.

The apparatus described above may be varied in construction in accordance with the invention without departing from the spirit thereof, the scope of the invention being defined in the following claims.

What is claimed is:

1. In a wrapping machine, an article conveying device comprising spaced endless conveyor members, driving means for said endless members and driven means for said members spaced longitudinally from said driving means and supporting said endless members, spaced parallel bars, bearings on said bars supporting said driving means, bearings on said bars for supporting said driven members, a keyed axle supported by the bearings of said driving means, and supporting said driving means for the rotational drive thereof, said driving means and the bearings thereof being axially displaceable with respect to said keyed axle, means for locking said driving means to their respective bearings, threaded bearings on said bars, axle means coupling said bars, oppositely threaded portions on said axle means for engaging said threaded bearings, means for driving said axle means to control the spacing of said bars and thereby of said endless conveyor members, means for driving said axle and thereby said conveyor members, flights mounted on and extending in equidistantly spaced relationship from said endless conveyors for engaging and moving articles to be wrapped through said machine, said endless conveyor members comprising chains, tracks on said bars for the support of said chains, and rollers on said flights, said rollers and chains cooperatively bracketing said tracks therebetween for the substantially rigid positioning of said chains, and each of said flights being pivotally coupled intermediate its ends to its associated chain comprising a link for each flight pivoted at one end to the associated chain and adapted to be coupled at the other end to one end of the associated flight, and an adjustably mountable eccentric bushing for each flight coupling the associated flight with its associated link so that the position of each of said flights with respect to its associated chain can be controlled through the mounting of said eccentric bushing.

2. In a wrapping machine, an article conveying device comprising spaced endless conveyor members, driving means for said endless members and driven means for said members spaced longitudinally from said driving means and supporting said endless members, spaced parallel bars, bearings on said bars supporting said driving means, bearings on said bars for supporting said driven members, a keyed axle supported by the bearings of said driving means, and supporting said driving means for the rotational drive thereof, said driving means and the bearings thereof being axially displaceable with respect to said keyed axle, means for locking said driving means to their respective bearings, threaded bearings on said bars, axle means coupling said bars, oppositely threaded portions on said axle means for engaging said threaded bearings, means for driving said axle means to control the spacing of said bars and thereby of said endless conveyor members, means for driving said axle and thereby said conveyor members, and flights adjustably connected to and extending in equidistantly spaced relationship from each of said endless conveyors for engaging and moving articles to be wrapped through said machine, said flights including spaced depending arms attached at their upper ends to opposite sides of each of said endless conveyor members, the lower ends of said arms mounted to and supporting said flights against substantial individual lateral movement when in engagement with an article being advanced thereby, and other means connected to at least one of said arms for maintaining said flight in operative position relative to the path of travel of said endless conveyor members.

3. In a wrapping machine, an article conveying device comprising spaced endless conveyor members, driving means for said endless members and driven means for said members spaced longitudinally from said driving means and supporting said endless members, spaced parallel bars, bearings on said bars supporting said driving means, bearings on said bars for supporting said driven members, a keyed axle supported by the bearings of said driving means, and supporting said driving means for the rotational drive thereof, said driving means and the bearings thereof being axially displaceable with respect to said keyed axle, means for locking said driving means to their respective bearings, threaded bearings on said bars, axle means coupling said bars, oppositely threaded portions on said axle means for engaging said threaded bearings, means for driving said axle means to control the spacing of said bars and thereby of said endless conveyor members, means for driving said axle and thereby said conveyor members, flights adjustably connected to and extending in equidistantly spaced relationship from each of said endless conveyors for engaging and moving articles to be wrapped through said machine, said endless conveyor members including chains, tracks on said bars for the support of said chains, and rollers on said flights, said rollers and chains co-operatively bracketing said tracks therebetween for the substantially rigid positioning of said chains.

4. In a wrapping machine, an article conveying device comprising a plurality of sets of laterally spaced article conveying flights for conveying an article through a foldway, laterally spaced and aligned endless chains supporting said article conveying flights and adapted to be driven by a power source, a control device including laterally spaced driving and driven sprockets coupled to said endless chains supporting said flights, coupling means coupling said sprockets to said power source, control mechanism for controlling the lateral spacing of said flights of said sets of flights and said sprockets, each of said flights including spaced depending arms, means pivotally attaching said arms at points intermediate their ends to opposite sides of said chains, the lower ends of said arms supporting said flights against substantial individual lateral movement when in engagement with an article being advanced thereby, guide bars extending along a portion of the path of travel of said chains and stabilizing members on the upper ends of said arms, said stabilizing members and chains co-operatively bracketing said guide bars therebetween for the substantially rigid positioning of said chains.

5. The invention defined in claim 4 wherein said pivotal means include adjustably mounted eccentric bushings for controlling the position of each of said flights relative to its associated chain.

References Cited in the file of this patent

UNITED STATES PATENTS

| | | |
|---|---|---|
| 1,278,543 | Wilson | Sept. 10, 1918 |
| 1,759,709 | Peterson | May 20, 1930 |
| 2,267,549 | Bronander | Dec. 23, 1941 |
| 2,594,207 | Pierce | Apr. 22, 1952 |
| 2,623,746 | Gegenheimer et al. | Dec. 30, 1952 |
| 2,649,675 | Schrage | Aug. 25, 1953 |
| 2,650,459 | McGinley | Sept. 1, 1953 |
| 2,669,342 | Neal | Feb. 16, 1954 |
| 2,780,342 | Good | Feb. 5, 1957 |